United States Patent
Pearl, Jr. et al.

(10) Patent No.: US 10,766,813 B2
(45) Date of Patent: Sep. 8, 2020

(54) NANOCELLULOSE FOAM STABILIZING ADDITIVE

(71) Applicant: Halliburton Energy Services, Inc., Houston, TX (US)

(72) Inventors: William Cecil Pearl, Jr., Spring, TX (US); Samuel J. Lewis, Spring, TX (US); Jeffery Dwane Karcher, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 99 days.

(21) Appl. No.: 16/062,584

(22) PCT Filed: Feb. 8, 2016

(86) PCT No.: PCT/US2016/016994
§ 371 (c)(1),
(2) Date: Jun. 14, 2018

(87) PCT Pub. No.: WO2017/138913
PCT Pub. Date: Aug. 17, 2017

(65) Prior Publication Data
US 2018/0362403 A1 Dec. 20, 2018

(51) Int. Cl.
| | |
|---|---|
| *C04B 20/00* | (2006.01) |
| *C04B 28/04* | (2006.01) |
| *C04B 28/06* | (2006.01) |
| *C04B 28/08* | (2006.01) |
| *C09K 8/473* | (2006.01) |
| *C09K 8/467* | (2006.01) |
| *C04B 18/24* | (2006.01) |
| *C04B 18/26* | (2006.01) |
| *C04B 38/10* | (2006.01) |
| *C04B 103/48* | (2006.01) |
| *C04B 103/40* | (2006.01) |

(52) U.S. Cl.
CPC .......... *C04B 20/006* (2013.01); *C04B 18/241* (2013.01); *C04B 18/26* (2013.01); *C04B 28/04* (2013.01); *C04B 28/06* (2013.01); *C04B 28/08* (2013.01); *C04B 38/10* (2013.01); *C09K 8/467* (2013.01); *C09K 8/473* (2013.01); *C04B 2103/40* (2013.01); *C04B 2103/48* (2013.01); *C09K 2208/10* (2013.01); *Y02W 30/97* (2015.05)

(58) Field of Classification Search
CPC ..... C04B 18/241; C04B 18/26; C04B 20/006; C04B 28/04; C04B 28/06; C04B 28/08; C04B 38/10; C04B 2103/40; C04B 2103/48; C09K 8/467; C09K 8/473; C09K 2208/10

See application file for complete search history.

(56) References Cited

U.S. PATENT DOCUMENTS

| 4,744,987 | A | 5/1988 | Mehra et al. |
|---|---|---|---|
| 5,275,699 | A | 1/1994 | Allan et al. |
| 6,063,738 | A | 5/2000 | Chatterji et al. |
| 6,176,314 | B1 * | 1/2001 | Stephens ............ C04B 22/0053 166/293 |
| 6,379,501 | B1 | 5/2002 | Zhang et al. |
| 2004/0221990 | A1 | 11/2004 | Heathman et al. |
| 2007/0123434 | A1 | 5/2007 | Lewis et al. |
| 2013/0196883 | A1 | 8/2013 | Rincon-Torres et al. |
| 2013/0274149 | A1 | 10/2013 | Lafitte et al. |
| 2014/0020895 | A1 | 1/2014 | Agapiou et al. |
| 2015/0184345 | A1 | 7/2015 | Nelson et al. |

FOREIGN PATENT DOCUMENTS

WO 204083599 9/2004

OTHER PUBLICATIONS

"Aerogels from nanofibrillated cellulose with tunable oleophobicity" Aulin et al. dated May 14, 2010.
"Ultra porous nanocellulose aerogels as separation medium for mixtures of oil/water liquids" Cervin et al. dated Dec. 17, 2011.
"Long and entangled native cellulose I nanofibers allow flexible aerogels and hierarchically porous templates for functionalities" Paakko et al. dated Sep. 23, 2018.
"Strong and Tough Cellulose Nanopaper with High Specific Surface Area and Porosity" Sehaqui et al. dated Sep. 2, 2011.
"Cellulose nanowhisker aerogels" Heath et al. dated Jul. 13, 2010.
"Lightweight and Strong Cellulose Materials Made from Aqueous Foams Stabilized by Nanofibrillated Cellulose" Cervin at al. dated Dec. 19, 2012.
"Preparation and Characterization of Niobium Oxide Coated Cellulose Fiber" Campos et al. published 1996.
"Influence of cellulose ethers molecular parameters on hydration kinetics of Portland cement at early ages" Hua et al. dated Feb. 25, 2012.
"Metal Nanoparticles on Natural Cellulose Fibers: Electrostatic Assembly and in Situ Synthesis" Dong et al. dated Mar. 26, 2009.
"Study of the Interactions of Calcium Ions with Lignin, Cellulose, and Pectin" Torre et al. dated 1992.
"Valorization of micro-cellulose fibers in self-compacting concrete" Mohamed et al. dated Jul. 2, 2010.
"Mechanical performance of ductile cement mortar composites reinforced with nanofibrillated cellulose" Claramunt et al. dated Dec. 12, 2011.

(Continued)

*Primary Examiner* — Anthony J Green
(74) *Attorney, Agent, or Firm* — Thomas Rooney; C. Tumey Law Group PLLC

(57) ABSTRACT

A variety of systems, methods and compositions are disclosed, including, in one method, providing a foamed cement composition comprising a hydraulic cement, water, a foaming surfactant, a gas, and a nanocellulose foam stabilizing additive; placing the foamed cement composition in a selected location; and allowing the foamed cement composition to set.

20 Claims, 2 Drawing Sheets

(56) References Cited

OTHER PUBLICATIONS

"Reduction of water wettability of nanofibrillated cellulose by adsorption of cationic surfactants" Xhanari et al. Dec. 24, 2010.
"Nanofibrillated Cellulose Surface Modification: A Review" Missoum et al. dated May 3, 2013.
International Search Report and Written Opinion for PCT/US2016/016994 dated Oct. 12, 2016.
Xu, X., Liu, F., Jiang, L., Zhu, J. Y., Haagenson, D., & Wiesenborn, D. P. (2013). Cellulose Nanocrystals vs. Cellulose Nanofibrils: A Comparative Study on Their Microstructures and Effects as Polymer Reinforcing Agents. ACS Applied Materials & Interfaces, 5(8), 2999-3009.
Wikipedia, Nanocellulose, 2020.

* cited by examiner

NANOCELLULOSE FOAM STABILIZING ADDITIVE

BACKGROUND

Cement compositions may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement composition may be pumped into an annulus between the walls of the well bore and the exterior surface of the pipe string disposed therein. The cement composition may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like. Cement compositions also may be used in surface applications, for example, construction cementing.

Cement compositions utilized in subterranean operations may be lightweight to prevent excessive hydrostatic pressure from being exerted on subterranean formations penetrated by the well bore, whereby the formations may be unintentionally fractured. One type of lightweight cement composition is a foamed cement composition, i.e., a cement composition that comprises entrained gas. In addition to being lightweight, the gas contained in the foamed cement composition may improve the ability of the composition to maintain pressure and prevent the flow of formation fluids into and through the cement composition during its transition time, i.e., the time during which the cement composition changes from a true fluid to a set mass. Foamed cement compositions may also be advantageous because they have low fluid loss properties and may act to prevent the loss of fluid circulation. Additionally, foamed cement compositions when set have a lower modulus of elasticity than non-foamed cements, which is often desirable as it enables the resultant set cement, for example, to resist hoop stresses exerted on the set cement in the annulus.

A foamed cement composition generally may be prepared by mixing a gas, such as air or nitrogen, with the cement composition. Foamed cement composition typically further may comprise a variety of surfactants commonly referred to as "foaming surfactants" for facilitating the foaming of a cement composition and various other surfactants commonly referred to as "foam stabilizers" for preventing the components of the foamed cement composition from prematurely separating. While a variety of foaming agents and foam stabilizers are well known in the art, problems have been associated with their use. For example, certain foaming agents, such as those consisting of a surfactant of Formula 1, $R-(OR')_n-OSO_3-X^+$, and foam stabilizers, such as a glycol of Formula 2, $CH_3O-(CH_2CH_2O)_nH$, or a betaine surfactant, may lower the compressive strength of the resultant set cement composition. Furthermore, upon mixing, the foaming agents and foam stabilizers used heretofore with water, gelation may occur, which is undesirable. Moreover, some foaming agents and/or foam stabilizers may have undesirable environmental characteristics and/or may be limited by strict environmental regulations in certain areas of the world.

BRIEF DESCRIPTION OF THE DRAWINGS

These drawings illustrate certain aspects of some of the systems, methods and cement compositions of the present disclosure, and should not be used to limit or define the method.

DETAILED DESCRIPTION

Figure 1:
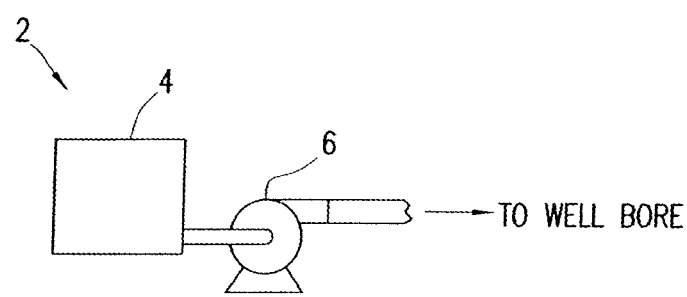
FIG. 1 is a schematic diagram that illustrates a system for preparation and delivery of a cement composition to a wellbore in accordance with certain examples.

Systems and methods are directed to nanocellulose foam stabilizing additives and, in certain systems and methods, to foamed cement compositions comprising nanocellulose foam stabilizing additives and methods of cementing with nanocellulose foam stabilizing additives in subterranean applications. There may be several potential advantages to the systems, methods and compositions of the present disclosure, only some of which may be alluded to herein. One of the many potential advantages of the systems, methods and compositions of the present disclosure is that the nanocellulose foam stabilizing additive may keep foam intact. Another potential advantage of the systems, methods and compositions of the present disclosure is that the nanocellulose foam stabilizing additive may be resistant to contamination as well as destabilization mechanisms such as liquid drainage and gravity drainage.

The foamed cement compositions may comprise a cement, a nanocellulose foam stabilizing additive, a gas and water. Foaming surfactants may also be included in the foamed cement compositions. Those of ordinary skill in the art will appreciate that the cement compositions generally should have a density suitable for a particular application. When foamed, the foamed cement compositions may have a density in the range of from about 4 pounds per gallon ("lb/gal") to about 13 lb/gal, alternatively, about 9 lb/gal to about 13 lb/gal, or alternatively, about 7 lb/gal to about 9 lb/gal. In addition be being foamed, the cement compositions may comprise other means to reduce their densities, such as hollow microspheres, low-density elastic beads, or other density-reducing additives known in the art. Those of ordinary skill in the art, with the benefit of this disclosure, will recognize the appropriate density for a particular application.

The foamed cement compositions may comprise a cement. Any of a variety of cements suitable for use in subterranean cementing operations may be used in accordance with systems, methods and cement compositions of the present disclosure. Suitable examples may include geopolymer cements or hydraulic cements. Geopolymer cements may comprise aluminosilicate, sodium silicates, or potassium silicates in addition to the water. Geopolymer cements may be generally categorized as follows: slag-based geopolymer cement; rock-based geopolymer cement; fly ash-based geopolymer cement type 1: alkali-activated fly ash geopolymer; fly ash-based geopolymer cement type 2: slag/fly ash-based geopolymer cement; and ferro-sialate-based geopolymer cement. Suitable hydraulic cements may comprise calcium, aluminum, silicon, oxygen and/or sulfur, which set and harden by reaction with water Such hydraulic cements, include, but are not limited to, Portland cements, pozzolan cements, gypsum cements, high-alumina-content cements, slag cements, silica cements, and combinations thereof. Pozzolan cements can contain, without limitation, fly ash, silica fume, pumice, perlite, organic ashes (sugarcane, rice husk, etc.), shale, zeolites, clays, or combinations thereof In certain systems, methods and cement compositions, the hydraulic cement may comprise a Portland cement. Portland cements that may be suited for use in systems, methods and cement compositions of the present disclosure may be classified as Class A, C, H and G cements according to American Petroleum Institute, API Specification for Materials and Testing for Well Cements, API Specification 10, Fifth Ed., Jul. 1, 1990. In addition, in some systems, methods and cement compositions, hydraulic cements suitable for use in the present disclosure may be classified as ASTM Type I, II, or III.

The foamed cement compositions may comprise a nanocellulose foam stabilizing additive. Without limitation, the stabilizing ability of the nanocellulose foam stabilizing additive with an unstable foam slurry formulation may result in stable foamed slurry designs. The nanocellulose foam stabilizing additive addition to foamed slurries may stabilize the foam and may also make the foam more resistant to destabilizing additives unlike other common stabilizing agents. The nanocellulose foam stabilizing additive may comprise a nanofibril cellulose. Nanofibril cellulose ("NFC") has been shown to stabilize aqueous foams which may then be dehydrated to form very porous lightweight materials. Without limitation, the NFC may stabilize the outside of a bubble or a bubble wall of the foam. The term "nanofibril cellulose" or "NFC" generally refers to cellulose comprising nanofibrils, whether isolated nanofibrils or bundles of nanofibrils, derived from a cellulose raw material. The nanocellulose foam stabilizing additive may be provided as an aqueous dispersion or suspension of the NFC. The aqueous dispersion may be gelatinous in nature NFC may be described as long and flexible cellulose nanofibrils and may be obtained from cellulose fiber by mechanical disintegration, for example. Dimensions for NFC may include nanofibrils with a high aspect ratio. The NFC may include individual nanofibrils having lengths from about 35 nm to about 3000 nm or even longer. The NFC may include individual nanofibrils having diameters of about 1000 nm or less, about 500 nm or less, or about 100 nm or less, or about 20 nm or less. By way of example, the NFC may include individual nanofibrils having lengths of about 3000 nm or greater and diameters of about 100 nm or less, less than from about 1 nm to about, and diameters of less than 100 nm.

NFC may be manufactured from a number of different cellulosic sources. Wood may be an important industrial source of cellulosic fibers, and may be a main raw material used to produce NFC. Bleached kraft pulp and/or bleached sulfite pulp may also be used as a starting material for NFC. NFC may also be derived from sugar beet pulp, wheat straw, soy hulls, sisal, bagasse, palm trees, ramie, carrots, and luffa cylindrica. A variety of mechanical defibrillation methods may be used, including high-pressure homogenization, grinding, ultrasonication, cryocrushing and high-speed blending.

Nanofibril cellulose may be differentiated from other types of nanocellulose, such as nanocrystalline cellulose, which may be prepared by different techniques. Without limitation, two main pretreatments may be applied to cellulose fibers in the preparation of NFC: (i) Enzymatic pretreatment or (ii) TEMPO pretreatment.

Enzymatic pre-treatments may allow NFC to be manufactured with significant reduced energy consumption. Cellulose may be degraded in nature by a set of enzymes called cellulases. They can be classified as A- and B-type cellulases, termed cellobiohydrolases, which are able to attack highly crystalline cellulose, or as C- and D-type cellulases or endoglucanases. Cellobiohydrolases and endoglucanases may show strong synergistic effects. During preparation of NFC, isolated cellulases may be applied to modify the structure rather than degrading the cellulose. Endoglucanase pre-treatment may facilitate the disintegration of cellulosic wood fiber pulp by increasing its swelling in water. Moreover, this pre-treatment may confer a more favorable structure on the NFC, as it may reduce the fiber length and increase the extent of fine material, compared to the result of acid hydrolysis pre-treatment. The enzymatic pre-treatment may give significantly more homogeneous NFC suspensions than acid hydrolysis pre-treatment.

TEMPO-mediated oxidation is a method that may be used for modifying selectively the surface of native cellulose under aqueous and mild conditions. The basic principle of this form of pre-treatment may include the oxidation of cellulose fibers via the addition of NaClO to aqueous cellulose suspensions in the presence of catalytic amounts of 2,2,6,6 tetramethyl-1-piperidinyloxy (TEMPO) and NaBr at pH 10-11 at room temperature. The $C_6$ primary hydroxyl groups of cellulose are thus selectively converted to carboxylate groups via the $C_6$ aldehyde groups, and only NaClO and NaOH may then be consumed.

Without limitation, the surface of the NFC used in the nanocellulose foam stabilizing additives may be modified or unmodified. Modification of the surface may include, without limitation, modification either (i) by physical interactions or adsorption of molecules or macromolecules onto their surface or (ii) by using a chemical approach to achieve covalent bonds between cellulosic substrates and the grafting agent. NFC may display a high surface area generally of the order of 50-70 $m^2/g$, for example, which may increase the quantity of surface hydroxyl groups available for surface modification and change the classic conditions of grafting. Carboxymethylation may also be used as pretreatment prior to mechanical defibrillation and also to modify the surface chemistry of the ensuing carboxymethylated NFC. The surface of NFC may be tuned by using surfactants or polyelectrolyte adsorption. Surfactants may be amphiphilic organic compounds, i.e., compounds containing both hydrophobic groups and hydrophilic groups. Carboxymethylated NFC may be modified by coating with various amounts of a fluorosurfactant, such as perfluorooctadecanoic acid ($C_{17}F_{35}COOH$). Alternatively, a polyelectrolyte solution may be used to modify surface properties of NFC.

NFC may be desirable because it may be renewable, composed of high strength fibers and lightweight. The nanocellulose foam stabilizing additive may provide physical support from the NFC, utilizing a "scaffold" approach unlike other stabilizing agents. This may allow the nanocellulose foam stabilizing additive to further resist the destabilizing effects of certain additives.

The nanocellulose foam stabilizing additive may be included in the foamed cement compositions in an amount sufficient to provide stabilization of the foam. Without limitation, the nanocellulose foam stabilizing additive may be present in the foamed cement compositions in an amount in the range of about 0.1% to about 10% by weight of the cement on a dry basis ("bwoc"). For example, the nanocellulose foam stabilizing additive may be present in the foamed cement compositions in an amount in the range from about 0.1% to about 5% bwoc. The nanocellulose foam stabilizing additive may be dispersed throughout the foamed cement composition.

The cement compositions may be foamed at the well site. By way of example, the cement compositions may be foamed immediately prior to use. The cement compositions may be foamed with a foaming surfactant and by entraining gas into the cement compositions. The cement compositions may be foamed, for example, to provide a cement composition with a reduced density.

The gas used for foaming the composition may be any suitable gas for foaming, including, but not limited to: air, nitrogen, and combinations thereof Generally, the gas should be in an amount sufficient to form the desired foam. Foaming additives may be included to facilitate foaming and/or stabilize the resultant foam formed therewith.

The foaming surfactant may include a surfactant or combination of surfactants that reduce the surface tension of the water. By way of example, the foaming surfactant may comprise an anionic, nonionic, amphoteric (including zwitterionic surfactants), cationic surfactant, or mixtures thereof Examples of suitable foaming surfactants may include, but are not limited to: betaines; anionic surfactants such as hydrolyzed keratin; amine oxides such as a alkyl or alkene dimethyl amine oxides; cocoamidopropyl dimethylamine oxide; methyl ester sulfonates; alkyl or alkene amidobetaines such as cocoamidopropyl betaine; alpha-olefin sulfonates; quaternary surfactants such as trimethyltallowammonium chloride and trimethylcocoammonium chloride; $C_8$ to $C_{22}$ alkylethoxylate sulfates; and combinations thereof. Specific examples of suitable foaming surfactants include mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. Examples of suitable foaming surfactants are ZONESEALANT™ 2000 agent and Foamer 1026™ Foamer/Stabilizer, both available from Halliburton Energy Services Inc., Houston, Tex. The foamed cement compositions may be foamed within a foam quality range of between about 5% to about 80% and, more particularly, from about 18% to about 38%. As used herein, the term "foam quality" refers to the volume of entrained gas and is defined by the following formula: Foam Quality=(Total Foam Volume−Liquid Volume)/Total Foam Volume. Generally, the foaming surfactant may be present in an amount sufficient to provide a suitable foam. Without limitation, the foaming surfactant may be present in an amount in the range of from about 0.5% to about 5% by volume of the water ("bvow").

The water used in the foamed cement compositions of the present disclosure may be fresh water or salt water. As used herein, the term "salt water" refers to unsaturated salt water and saturated salt water, including brines and seawater. Generally, the water may be from any source, provided that it should not contain an excess of compounds that may undesirably affect other components in the foamed cement composition. Further, the water may be present in an amount sufficient to form a pumpable slurry. In certain foamed cement compositions, the water may be present in the foamed cement composition in an amount in the range of about 33% to about 200% bwoc. For example, the water may be present in the foamed cement composition in the range of about 35% to about 70% bwoc. One of ordinary skill in the art with the benefit of this disclosure will recognize the appropriate amount of water for a chosen application.

Other additives suitable for use in subterranean cementing operations also may be added to the foamed cement compositions as desired by those of ordinary skill in the art. Examples of such additives include, but are not limited to, strength-retrogression additives, set accelerators, set retarders, weighting agents, lightweight additives, gas-generating additives, mechanical property enhancing additives, lost-circulation materials, filtration-control additives, dispersants, a fluid loss control additive, thixotropic additives, and combinations thereof. Specific examples of these, and other, additives include crystalline silica, amorphous silica, fumed silica, salts, fibers, hydratable clays, calcined shale, vitrified shale, microspheres, fly ash, slag, diatomaceous earth, metakaolin, rice husk ash, natural pozzolan, zeolite, cement kiln dust, lime, elastomers, resins, latex, combinations thereof, and the like. A person having ordinary skill in the art, with the benefit of this disclosure, will readily be able to determine the type and amount of additive useful for a particular application and desired result.

Weighting agents are typically materials that weigh more than water and may be used to increase the density of the foamed cement compositions. By way of example, weighting agents may have a specific gravity of about 2 or higher (e.g., about 2, about 4, etc.). Examples of weighting agents that may be used include, but are not limited to, hematite, hausmannite, and barite, and combinations thereof. Specific examples of suitable weighting agents include HI-DENSE® weighting agent, available from Halliburton Energy Services, Inc.

Lightweight additives may be included in the foamed cement compositions to, for example, decrease the density of the cement compositions. Examples of suitable lightweight additives include, but are not limited to, bentonite, coal, Gilsonite, hollow microspheres, low-density elastic beads, nitrogen, pozzolan-bentonite, sodium silicate, combinations thereof, or other lightweight additives known in the art.

Gas-generating additives may be included in the foamed cement compositions to release gas at a predetermined time, which may be beneficial to prevent gas migration from the formation through the foamed cement composition before it hardens. The generated gas may combine with or inhibit the permeation of the foamed cement composition by formation gas. Examples of suitable gas-generating additives include, but are not limited to, metal particles (e.g., aluminum powder) that react with an alkaline solution to generate a gas.

Mechanical-property-enhancing additives may be included in the foamed cement compositions to, for example, ensure adequate compressive strength and long-term structural integrity. These properties can be affected by the strains, stresses, temperature, pressure, and impact effects from a subterranean environment. Examples of mechanical property enhancing additives include, but are not limited to, carbon fibers, glass fibers, metal fibers, mineral fibers, silica fibers, polymeric elastomers, and latexes.

Lost-circulation materials may be included in the foamed cement compositions to, for example, help prevent the loss of fluid circulation into the subterranean formation. Examples of lost-circulation materials include but are not limited to, cedar bark, shredded cane stalks, mineral fiber, mica flakes, cellophane, calcium carbonate, ground rubber, polymeric materials, pieces of plastic, grounded marble, wood, nut hulls, plastic laminates (Formica® laminate), corncobs, and cotton hulls.

Thixotropic additives may be included in the foamed cement compositions to, for example, provide a foamed cement composition that may be pumpable as a thin or low viscosity fluid, but when allowed to remain quiescent attains a relatively high viscosity. Among other things, thixotropic additives may be used to help control free water, create rapid gelation as the composition sets, combat lost circulation, prevent "fallback" in annular column, and minimize gas migration. Examples of suitable thixotropic additives include, but are not limited to, gypsum, water soluble carboxyalkyl, hydroxyalkyl, mixed carboxyalkyl hydroxyalkyl either of cellulose, polyvalent metal salts, zirconium oxychloride with hydroxyethyl cellulose, or a combination thereof.

The foamed cement compositions may set to have a desirable compressive strength. Compressive strength is generally the capacity of a material or structure to withstand axially directed pushing forces. The compressive strength may be measured at a specified time after preparation of the foamed cement compositions while the foamed cement composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ Ultrasonic Cement Analyzer, available from Fann Instrument Company, Houston, Tex. Compressive strength values may be determined in accordance with API RP 10B-2, *Recommended Practice for Testing Well Cements*, First Edition, July 2005.

By way of example, the foamed cement compositions may develop a 24-hour compressive strength in the range of from about 50 psi to about 5000 psi, alternatively, from about 100 psi to about 4500 psi, or alternatively from about 500 psi to about 4000 psi. Without limitation, the foamed cement compositions may develop a compressive strength in 24 hours of at least about 50 psi, at least about 100 psi, at least about 500 psi, or more. The compressive strength values may be determined using destructive or non-destructive methods at any temperature, however compressive strength development at temperatures above 400° F. may be of particular importance for potential use in subterranean formations having relatively high bottom hole static temperatures.

In some examples, the foamed cement compositions may have desirable thickening times. Thickening time typically refers to the time a fluid, such as the foamed cement composition, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the foamed cement composition to reach 70 Bc and may be reported as the time to reach 70 Bc. The foamed cement compositions may have thickening times greater than about 1 hour, alternatively, greater than about 2 hours, greater than about 15 hours, greater than about 30 hours, greater than about 100 hours, or alternatively greater than about 190 hours at 3,000 psi and temperatures in a range of from about 50° F. to about 500° F., alternatively, in a range of from about 250° F. to about 500° F., and alternatively at a temperature greater than about 400° F.

In accordance with the systems, methods and cement compositions of the present disclosure, a cement composition may be introduced into a selected location and allowed to set therein. As will be appreciated, the selected location may any suitable location above ground or in a subterranean formation where it is desired for the cement composition to set into a hardened mass. For example, the selected location may be an annulus between a pipe string located in a subterranean formation and the subterranean formation. As described above, the systems, methods and cement compositions of the present disclosure generally comprise a cement, the nanocellulose foam stabilizing additive, a foaming surfactant, a gas, and water.

As will be appreciated by those of ordinary skill in the art, the systems, methods and cement compositions of the present disclosure may be used in a variety of subterranean applications, including primary and remedial cementing. The foamed cement compositions may be introduced into a well bore and allowed to set. The systems, methods and cement compositions may comprise cement, the nanocellulose foam stabilizing additive, a foaming surfactant, a gas, and water. By way of example, in example primary cementing applications, a foamed cement composition may be introduced into an annular space between a subterranean formation and a pipe string (or between a pipe string and a large pipe string) located in the subterranean formation. The foamed cement composition may be allowed to set to form a hardened mass in the annular space. In addition, in example remedial cementing applications, a foamed cement composition may be used, for example, in squeeze cementing operations or in the placement of cement plugs.

As will be appreciated, the nanocellulose foam stabilizing additive may be used in a wide variety of subterranean operations, including well cementing operations. An example method for cementing may comprise providing a foamed cement composition comprising a hydraulic cement, water, a foaming surfactant, a gas, and a nanocellulose foam stabilizing additive; placing the foamed cement composition in a selected location; and allowing the foamed cement composition to set. The foamed cement composition may have a density in a range of from about 4 pounds per gallon to about 16 pounds per gallon, and wherein the water is present in an amount sufficient to form a pumpable slurry. The hydraulic cement may comprise at least one hydraulic cement selected from the group consisting of Portland cement, pozzolana cement, gypsum cement, high-alumina-content cement, slag cement, silica cement, and any combination thereof. The nanocellulose foam stabilizing additive may comprise nanofibril cellulose derived from at least one nanocellulose fiber selected from the group consisting of bacteria, wood, bleached kraft pulp, bleached sulfite pulp, sugar beet pulp, wheat straw, soy hulls, sisal, bagasse, palm trees, ramie, carrots, luffa cylindrica and any combination thereof. The nanocellulose foam stabilizing additive may be present in the cement composition in an amount of about 0.01% to about 10% by weight of the cement. The nanocellulose foam stabilizing additive may comprise individual nanofibrils with a diameter of about 1,000 nanometers or less. The nanocellulose foam stabilizing additive may comprise individual nanofibrils with a length from about 35 nanometers to about 10000 nanometers. The nanocellulose foam stabilizing additive may comprise individual nanofibrils with a diameter of about 100 nanometers or less and a length of about 1000 nanometers or greater. The nanocellulose foam stabilizing additive may be pretreated. The selected location may be a wellbore annulus in a primary cementing operation. The selected location may be in a wellbore in a subterranean formation.

A foamed cement composition may be provided that may comprise a hydraulic cement, water, a nanocellulose foam stabilizing additive, a foaming surfactant, and a gas. The foamed cement composition may have a density in a range of from about 4 pounds per gallon to about 16 pounds per gallon, and wherein the water is present in an amount sufficient to form a pumpable slurry. The hydraulic cement may comprise at least one hydraulic cement selected from the group consisting of Portland cement, pozzolana cement, gypsum cement, high-alumina-content cement, slag cement, silica cement, and any combination thereof. The nanocellulose foam stabilizing additive may comprise nanofibril cellulose derived from at least one nanocellulose fiber selected from the group consisting of bacteria, wood, bleached kraft pulp, bleached sulfite pulp, sugar beet pulp, wheat straw, soy hulls, sisal, bagasse, palm trees, ramie, carrots, luffa cylindrica and any combination thereof. The nanocellulose foam stabilizing additive may be present in the cement composition in an amount of about 0.01% to about 10% by weight of the cement. The nanocellulose foam stabilizing additive may comprise individual nanofibrils with a diameter of about 1,000 nanometers or less. The nanocellulose foam stabilizing additive may comprise individual nanofibrils with a diameter of about 100 nanometers or less and a length of about 1000 nanometers or greater.

A cementing system may be provided that may comprise a cement composition comprising a hydraulic cement, water, a nanocellulose foam stabilizing additive, a foaming surfactant, and a gas; mixing equipment capable of mixing the cement composition; and pumping equipment capable of delivering the cement composition into a wellbore. The nanocellulose foam stabilizing additive may comprise nanofibril cellulose derived from at least one nanocellulose fiber selected from the group consisting of bacteria, wood, bleached kraft pulp, bleached sulfite pulp, sugar beet pulp, wheat straw, soy hulls, sisal, bagasse, palm trees, ramie, carrots, luffa cylindrica and any combination thereof.

Referring now to FIG. 1, preparation of a foamed cement composition in accordance with example systems, methods and cement compositions will now be described. FIG. 1 illustrates a system 2 for preparation of a foamed cement composition and delivery to a wellbore in accordance with certain systems, methods and cement compositions. As shown, the foamed cement composition may be mixed in mixing equipment 4, such as a jet mixer, re-circulating mixer, or a batch mixer, for example, and then pumped via pumping equipment 6 to the wellbore. In some systems, methods and compositions, the mixing equipment 4 and the pumping equipment 6 may be disposed on one or more cement trucks as will be apparent to those of ordinary skill in the art. In some systems, methods and compositions, a jet mixer may be used, for example, to continuously mix the nanocellulose foam stabilizing additive, foaming surfactant, and/or gas with the water (and other cement compositions) as it is being pumped to the wellbore.

Figure 2A:
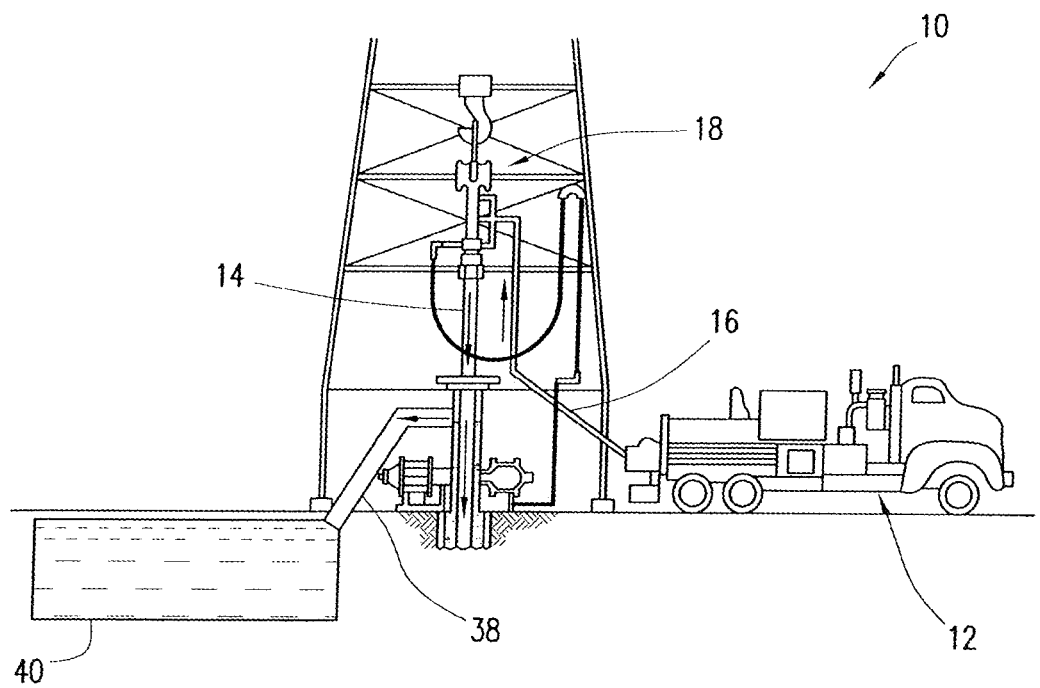
FIG. 2A is a schematic diagram that illustrates surface equipment that may be used in placement of a cement composition in a wellbore in accordance with certain examples.

An example technique for placing a foamed cement composition into a subterranean formation will now be described with reference to FIGS. 2A and 2B. FIG. 2A illustrates surface equipment 10 that may be used in placement of a foamed cement composition in accordance with certain systems, methods and cement compositions. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a foamed cement composition 14 through a feed pipe 16 and to a cementing head 18 which conveys the foamed cement composition 14 downhole.

Figure 2B:
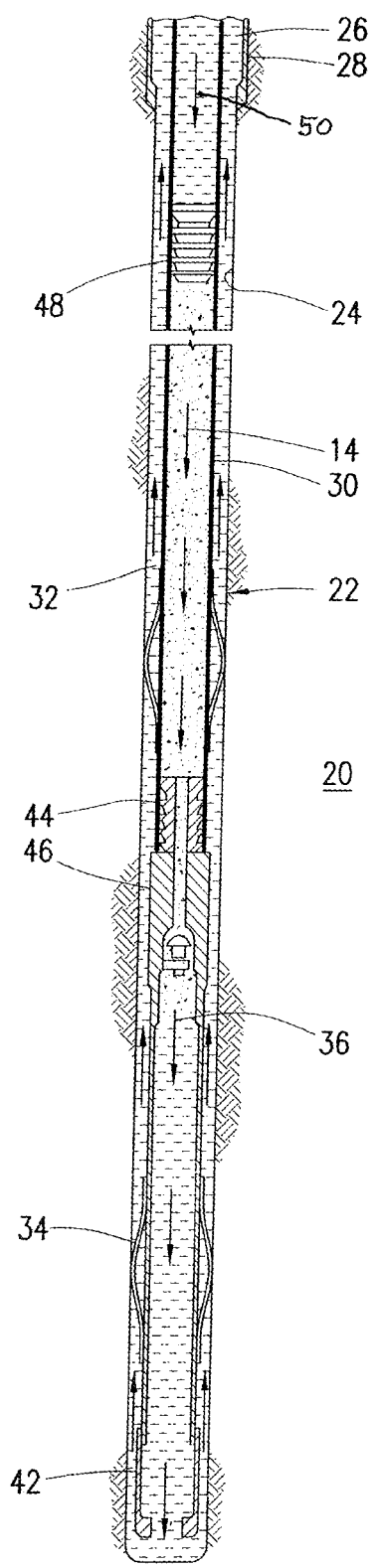
FIG. 2B is a schematic diagram that illustrates placement of a composition into a wellbore annulus in accordance with certain examples.

Turning now to FIG. 2B, the foamed cement composition 14 may be placed into a subterranean formation 20 in accordance with example systems, methods and cement compositions. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustration, a surface casing 26 has been inserted into the wellbore 22. The surface casing 26 may be cemented to the walls 24 of the wellbore 22 by cement sheath 28. In the illustration, one or more additional conduits (e.g., intermediate casing, production casing, liners, etc.), shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 2B, the foamed cement composition 14 may be pumped down the interior of the casing 30. The foamed cement composition 14 may be allowed to flow down the interior of the casing 30 through the casing shoe 42 at the bottom of the casing 30 and up around the casing 30 into the wellbore annulus 32. The foamed cement composition 14 may be allowed to set in the wellbore annulus 32, for example, to form a cement sheath that supports and positions the casing 30 in the wellbore 22. While not illustrated, other techniques may also be utilized for introduction of the foamed cement composition 14. By way of example, reverse circulation techniques may be used that include introducing the foamed cement composition 14 into the subterranean formation 20 by way of the wellbore annulus 32 instead of through the casing 30.

As it is introduced, the foamed cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2A. Referring again to FIG. 2B, a bottom plug 44 may be introduced into the wellbore 22 ahead of the foamed cement composition 14, for example, to separate the foamed cement composition 14 from the fluids 36 that may be inside the casing 30 prior to cementing. After the bottom plug 44 reaches the landing collar 46, a diaphragm or other suitable device should rupture to allow the cement composition 14 through the bottom plug 44. In FIG. 2B, the bottom plug 44 is shown on the landing collar 46. In the illustration, a top plug 48 may be introduced into the wellbore 22 behind the foamed cement composition 14. The top plug 48 may separate the foamed cement composition 14 from a displacement fluid 50 and also push the foamed cement composition 14 through the bottom plug 44.

The exemplary foamed cement compositions disclosed herein may directly or indirectly affect one or more components or pieces of equipment associated with the preparation, delivery, recapture, recycling, reuse, and/or disposal of the disclosed foamed cement compositions. For example, the disclosed cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary foamed cement compositions. The disclosed foamed cement compositions may also directly or indirectly affect any transport or delivery equipment used to convey the foamed cement compositions to a well site or downhole such as, for example, any transport vessels, conduits, pipelines, trucks, tubulars, and/or pipes used to compositionally move the foamed cement compositions from one location to another, any pumps, compressors, or motors (e.g., topside or downhole) used to drive the foamed cement compositions into motion, any valves or related joints used to regulate the pressure or flow rate of the foamed cement compositions, and any sensors (i.e., pressure and temperature), gauges, and/or combinations thereof, and the like. The disclosed foamed cement compositions may also directly or indirectly affect the various downhole equipment and tools that may come into contact with the foamed cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like To facilitate a better understanding of the present disclosure, the following example of certain aspects of some of the systems, methods and cement compositions are given. In no way should the following examples be read to limit, or define, the entire scope of the disclosure.

EXAMPLE

Four 14 ppg sample cement composition were mixed according to API procedures and foamed to 10 ppg. The control is known to be unstable. The compositions of the slurries are shown in Table 1. The nanocellulose foam stabilizing additive (NCFSA) was an aqueous mixture that contained 2% NFC by weight of water. The samples had 0.044, 0.089 and 0.133 BWOC of solid NFC. The samples are not commercially available, however, the samples are typically at concentrations of 2%, 6% or 10% NFC/$H_2O$. The FLCA used was HALAD® 344 fluid loss additive. The foaming surfactant used was ZONESEALANT™ 2000 agent.

TABLE 1

| Material | Control | Sample 1 | Sample 2 | Sample 3 |
|---|---|---|---|---|
| Holcim Class G Cement | 902.12 g | 902.12 g | 902.12 g | 902.12 g |
| Deionized H2O | 622.24 g | 602.24 g | 582.24 g | 542.24 g |
| NCFSA (2% in H20) | 0 | 20 g | 40 g | 80 g |
| FLCA | 0 | 0 | 4.51 | 4.51 |
| Foaming Surfactant | 12.08 g | 12.08 g | 12.08 g | 12.08 g |

After preparation, the foamed cement compositions were placed in graduated cylinders at room temperature for 2 hours. It was observed that the nanocellulose foam stabilizing additive had a stabilizing effect on the foamed cement compositions. The Control and Sample 1 (with minor amounts of the nanocellulose foam stabilizing additive) were unstable as the foam was submitted to a free fluid test at 80° F. for 2 hours. In contrast, Samples 2 and 3 with greater amounts of the nanocellulose foam stabilizing additive were stable. Samples 2 and 3 were then mixed and foamed to pour cylinders to cure in a water bath at atmospheric pressure and temperature for 6 days. The first day the sample cement compositions were at room temperature followed by 5 days at 100° F. From observation with a scanning electron microscope, the NFC in the nanocellulose foam stabilizing additive was dispersed through the set cement sample as small bundles. From further observation of the interface of the bubbles in the foam, the NFC is seen stabilizing the cement/air interface in the set cement sample.

Therefore, the present disclosure is well adapted to attain the ends and advantages mentioned as well as those that are inherent therein. The particular systems, methods and cement compositions disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative systems, methods and cement compositions disclosed above may be altered or modified and all such variations are considered within the scope and spirit of the present disclosure. While compositions and methods are described in terms of "comprising," "containing," "having," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of cementing comprising:
   providing a foamed cement composition comprising:
      a hydraulic cement,
      water,
      a foaming surfactant,
      a gas, and
      a nanocellulose foam stabilizing additive;
   placing the foamed cement composition in a selected location; and
   allowing the foamed cement composition to set,
   wherein the nanocellulose foam stabilizing additive comprises a nanofibril cellulose.

2. The method of claim 1 wherein the foamed cement composition has a density in a range of from about 4 pounds per gallon to about 16 pounds per gallon, and wherein the water is present in an amount sufficient to form a pumpable slurry.

3. The method of claim 1 wherein the hydraulic cement comprises at least one hydraulic cement selected from the group consisting of Portland cement, pozzolana cement, gypsum cement, high-alumina-content cement, slag cement, silica cement, and any combination thereof.

4. The method of claim 1 wherein the nanocellulose foam stabilizing additive comprises nanofibril cellulose derived from at least one nanocellulose fiber selected from the group consisting of bacteria, wood, bleached kraft pulp, bleached sulfite pulp, sugar beet pulp, wheat straw, soy hulls, sisal, bagasse, palm trees, ramie, carrots, luffa cylindrica and any combination thereof.

5. The method of claim 1 wherein the nanocellulose foam stabilizing additive is present in the cement composition in an amount of about 0.01% to about 10% by weight of the cement.

6. The method of claim 1 wherein the nanocellulose foam stabilizing additive comprises individual nanofibrils with a diameter of about 1,000 nanometers or less.

7. The method of claim 1 wherein the nanocellulose foam stabilizing additive comprises individual nanofibrils with a length from about 35 nanometers to about 10,000 nanometers.

8. The method of claim 1 wherein the nanocellulose foam stabilizing additive comprises individual nanofibrils with a diameter of about 100 nanometers or less and a length of about 1,000 nanometers or greater.

9. The method of claim 1 wherein the nanocellulose foam stabilizing additive is pretreated.

10. The method of claim 1 wherein the selected location is a wellbore annulus in a primary cementing operation.

11. The method of claim 1 wherein the selected location is in a wellbore in a subterranean formation.

12. A foamed cement composition comprising:
   a hydraulic cement,
   water,
   a nanocellulose foam stabilizing additive,
   a foaming surfactant, and
   a gas;
   wherein the nanocellulose foam stabilizing additive comprises a nanofibril cellulose.

13. The foamed cement composition of claim 12 wherein the foamed cement composition has a density in a range of from about 4 pounds per gallon to about 16 pounds per gallon, and wherein the water is present in an amount sufficient to form a pumpable slurry.

14. The foamed cement composition of claim 12 wherein the hydraulic cement comprises at least one hydraulic cement selected from the group consisting of Portland cement, pozzolana cement, gypsum cement, high-alumina-content cement, slag cement, silica cement, and any combination thereof.

15. The foamed cement composition of claim 12 wherein the nanocellulose foam stabilizing additive comprises nanofibril cellulose derived from at least one nanocellulose fiber selected from the group consisting of bacteria, wood, bleached kraft pulp, bleached sulfite pulp, sugar beet pulp, wheat straw, soy hulls, sisal, bagasse, palm trees, ramie, carrots, luffa cylindrica and any combination thereof.

16. The foamed cement composition of claim 12 wherein the nanocellulose foam stabilizing additive is present in the cement composition in an amount of about 0.01% to about 10% by weight of the cement.

17. The foamed cement composition of claim 12 wherein the nanocellulose foam stabilizing additive comprises individual nanofibrils with a diameter of about 1,000 nanometers or less.

18. The foamed cement composition of claim 12 wherein the nanocellulose foam stabilizing additive comprises individual nanofibrils with a diameter of about 100 nanometers or less and a length of about 1,000 nanometers or greater.

19. A cementing system comprising:
   a cement composition comprising:
      a hydraulic cement,
      water,
      a nanocellulose foam stabilizing additive, wherein the nanocellulose foam stabilizing additive comprises a nanofibril cellulose,
      a foaming surfactant, and
      a gas;
   mixing equipment capable of mixing the cement composition; and
   pumping equipment capable of delivering the cement composition into a wellbore.

20. The cementing system of claim 19 wherein the nanofibril cellulose is derived from at least one nanocellulose fiber selected from the group consisting of bacteria, wood, bleached kraft pulp, bleached sulfite pulp, sugar beet pulp, wheat straw, soy hulls, sisal, bagasse, palm trees, ramie, carrots, luffa cylindrica and any combination thereof.

* * * * *